United States Patent
Noguchi et al.

(10) Patent No.: US 10,605,917 B2
(45) Date of Patent: Mar. 31, 2020

(54) OPTICAL-SCANNING-TYPE OBJECT DETECTION DEVICE HAVING A MIRROR SURFACE TO BE INCLINED IN A DIRECTION CROSSING A ROTATION AXIS

(71) Applicant: KONICA MINOLTA, INC., Chiyoda-ku (JP)

(72) Inventors: Kazutaka Noguchi, Hachioji (JP); Ryouta Ishikawa, Chiyoda-ku (JP); Kazuki Matsui, Chiyoda-ku (JP)

(73) Assignee: Konica Minolta, Inc., Tokyo (JP)

( * ) Notice: Subject to any disclaimer, the term of this patent is extended or adjusted under 35 U.S.C. 154(b) by 120 days.

(21) Appl. No.: 15/768,408

(22) PCT Filed: Oct. 4, 2016

(86) PCT No.: PCT/JP2016/079412
§ 371 (c)(1),
(2) Date: Apr. 13, 2018

(87) PCT Pub. No.: WO2017/065049
PCT Pub. Date: Apr. 20, 2017

(65) Prior Publication Data
US 2018/0299548 A1 Oct. 18, 2018

(30) Foreign Application Priority Data
Oct. 16, 2015 (JP) ................. 2015-204194

(51) Int. Cl.
  *G01S 7/481* (2006.01)
  *G01S 17/02* (2020.01)
  *G02B 26/12* (2006.01)
(52) U.S. Cl.
  CPC .......... *G01S 17/026* (2013.01); *G01S 7/4817* (2013.01); *G02B 26/12* (2013.01)

(58) Field of Classification Search
  CPC ...... G01S 17/026; G01S 17/42; G01S 17/936; G01S 7/4817; G02B 26/12
  USPC ............................... 250/231.13, 216
  See application file for complete search history.

(56) References Cited

U.S. PATENT DOCUMENTS

| | | | |
|---|---|---|---|
| 5,790,275 A | 8/1998 | Iizuka | |
| 7,714,272 B2 * | 5/2010 | Urabe | G01D 5/34723 250/231.13 |

FOREIGN PATENT DOCUMENTS

| | | |
|---|---|---|
| DE | 102004050682 | 6/2005 |
| JP | 50-109737 | 8/1975 |
| JP | 06-324274 | 11/1994 |
| JP | 2014-029317 | 2/2014 |

(Continued)

OTHER PUBLICATIONS

Search Report dated Sep. 27, 2018 issued in the corresponding European Patent Application No. 16855303.0.

*Primary Examiner* — Que Tan Le
(74) *Attorney, Agent, or Firm* — Cozen O'Connor

(57) ABSTRACT

Provided is an object detection device which unlikely causes vignetting of a beam reflected from a mirror surface during rotation, and fully ensures object detection performance A light projecting system and a light receiving system are disposed so that a larger one of the area of a region on a mirror surface occupied by a beam emitted from a semiconductor laser and the area of a region on the mirror surface occupied by a beam incident on a photodiode has a longer movement length on the mirror surface during rotation than a smaller one.

8 Claims, 13 Drawing Sheets

(56) References Cited

FOREIGN PATENT DOCUMENTS

| | | |
|---|---|---|
| JP | 2014-115182 | 6/2014 |
| WO | WO 2014/168137 | 10/2014 |

\* cited by examiner

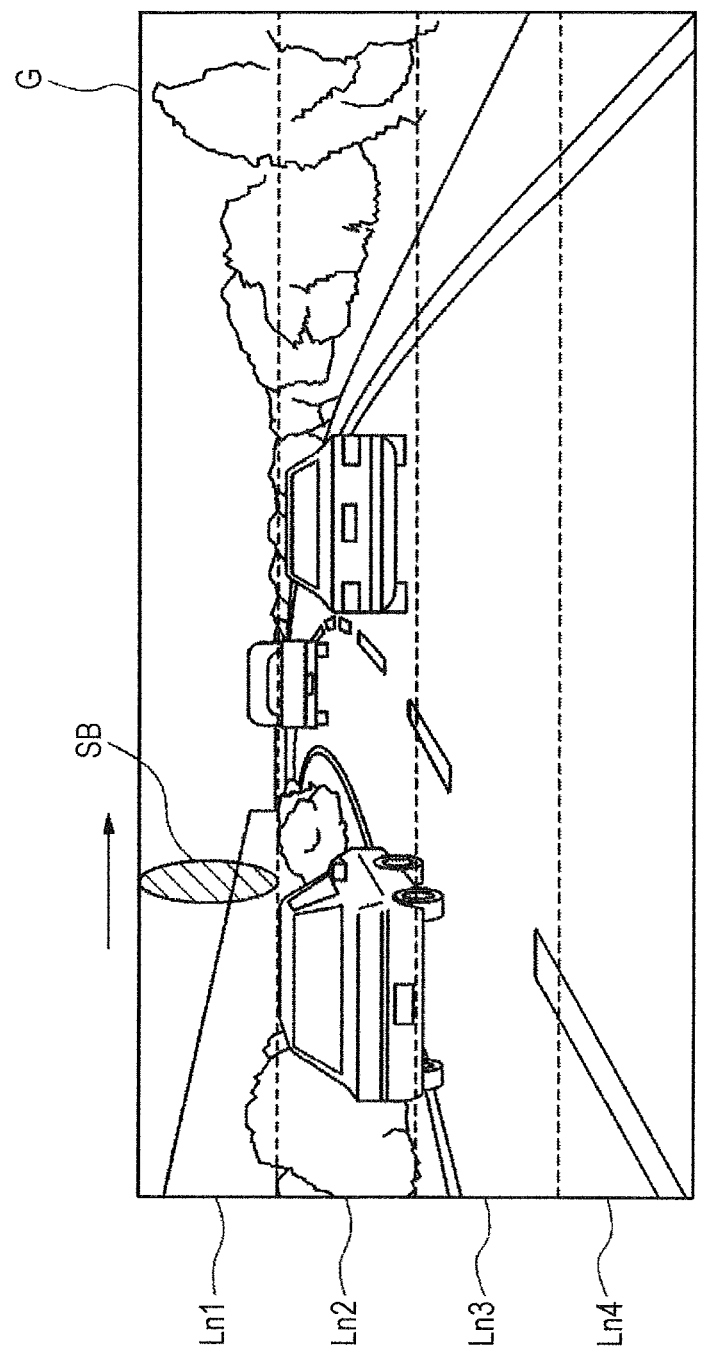

FIG. 5B
FIG. 5A
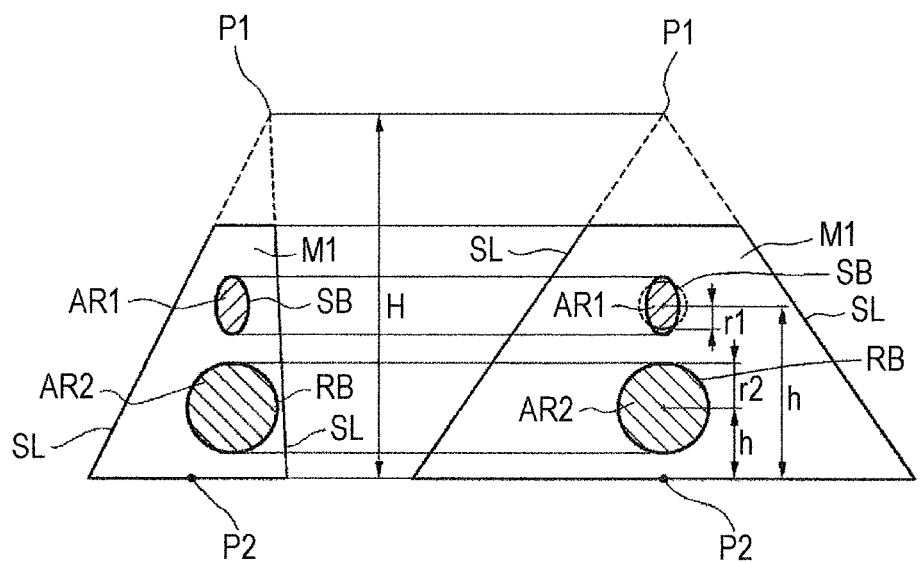
FIG. 6
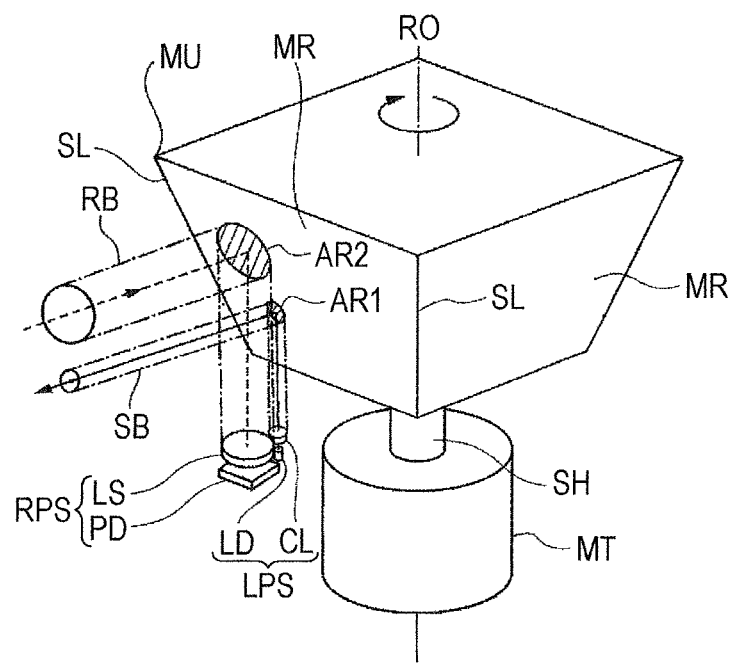

TOTAL EFFICIENCY

EFFICIENCY IN SMALL DIAMETER BEAM (r1 = 0.25)

OPTICAL-SCANNING-TYPE OBJECT DETECTION DEVICE HAVING A MIRROR SURFACE TO BE INCLINED IN A DIRECTION CROSSING A ROTATION AXIS

RELATED APPLICATIONS

This is a U.S. National Phase Application under 35 USC 371 of International Application PCT/JP2016/079412 filed on Oct. 4, 2016.

This application claims the priority of Japanese application no. 2015-204194 filed Oct. 16, 2015, the entire content of which is hereby incorporated by reference.

TECHNICAL FIELD

The present invention relates to an object detection device of optical scanning type which can detect a distant object.

BACKGROUND ART

In recent years, in the field of automobiles, air vehicles, or the like, to detect obstacles in the moving direction, object detection devices of optical scanning type have been developed and actually used, each of which emits, for example, a laser beam during scanning, receives light reflected from an object, and acquires obstacle information on the basis of a time difference between light emission and light reception.

In addition to the obstacle detection for mobile products as described above, such object detection devices may be used for crime prevention to detect suspicious individuals by being installed under eaves of buildings, may be used for geomorphic investigation or the like to acquire geomorphic information from above by being mounted to helicopters, aircrafts, or the like, or may be used for gas detection to measure the concentration of a gas in the air.

In general, an object detection device of optical scanning type includes a light projecting system which includes a laser diode as a light source and a collimator lens, and a light receiving system which includes a light receiving lens (or a mirror) and a light detection element such as a photodiode, and a reflection mirror which includes a reflection surface disposed between the light projecting system and the light receiving system. In such an object detection device of laser scanning type, the reflection mirror is rotated to scan and project light emitted from the light projecting system, having the merit of, not measuring an object at one point, but two-dimensionally widely measuring the object. Note that, as the light source, an LED or the like may be used in addition to the laser.

As an example, for a laser beam source, a general laser beam scanning method is known to project a laser beam to a mirror or a polygon mirror having a plurality of mirror surfaces, swing the mirror or rotate the polygon mirror, and scan the laser beam.

Patent Literature 1 discloses a configuration in which a rotation mirror has a first reflecting surface and a second reflecting surface to make an angle of 90°, and a beam emitted from a light source in a direction orthogonal to a rotation shaft is reflected twice on the first and second reflecting surfaces for scanning, preventing distortion of a scan line even if the rotation shaft tilts due to a rotational deviation. Furthermore, in Patent Literature 2, a laser radar is disclosed in which a plurality of pairs of first and second mirrors are disposed, and the crossing angles between the first mirrors and the second mirrors of the respective pairs are different from each other, enabling scanning at a plurality of different vertical scanning positions in single rotation.

CITATION LIST

Patent Literature

Patent Literature 1: JP 50-109737 A
Patent Literature 2: WO 2014/168137

SUMMARY OF INVENTION

Technical Problem

In such an object detecting device rotating a mirror to scan and project light as described above, a projected/received beam tends to cause vignetting (a beam out of a mirror surface) at both circumferential ends of a scanning range, that is, at a position at which mirror has a large rotation angle during scanning, and the use efficiency of the projected/received beam may be reduced and thereby detection performance may be reduced at both circumferential ends of the scanning range. However, any of Patent Literatures 1 and 2 does not refer to the problem of beam vignetting at both circumferential ends of the scanning range or does not offer the countermeasures against the beam vignetting.

The present invention has been made in view of the above disadvantages, and an object of the present invention is to provide an object detection device of optical scanning type which can inhibit a reduction in use efficiency of a projected/received beam at both circumferential ends of a scanning range and fully ensure object detection performance.

Solution to Problem

To achieve at least one of the above objects, an object detection device of optical scanning type according to one aspect of the present invention includes a mirror unit having a mirror surface formed to be inclined in a direction crossing a rotation axis, a light projecting system including a light source, and a light receiving system including a light reception element, wherein a beam emitted from the light source is reflected on the mirror surface and scanned and projected by the rotation of the mirror unit, and part of a beam scattered from the object, of the scanned and projected beam, is reflected on the mirror surface and received by the light reception element, wherein the light projecting system and the light receiving system are disposed so that the area of the mirror surface occupied by a beam emitted from the light source is different from the area of the mirror surface occupied by a beam incident on the light reception element, and a larger one of the two areas has a larger movement length on the mirror surface during rotation than a smaller one.

To achieve at least one of the above objects, another object detection device of optical scanning type according to one aspect of the present invention includes a mirror unit having a first mirror surface and a second mirror surface formed to be inclined in a direction crossing a rotation axis and opposed to each other at a predetermined angle, a light projecting system including a light source, and a light receiving system including a light reception element, wherein a beam emitted from the light source is reflected on the first mirror surface, reflected on the second mirror surface, and scanned and projected by the rotation of the mirror unit, and part of a beam scattered from the object, of the scanned and projected beam, is reflected on the second mirror surface, reflected on the first mirror surface, and received by the light reception element, wherein the light projecting system and the light receiving system are disposed so that the area of the first mirror surface occupied by a beam emitted from the light source is different from the area of the first mirror surface occupied by a beam incident on the light reception element, and a larger one of the two areas has a larger movement length on the first mirror surface during rotation than a smaller one.

Advantageous Effects of Invention

According to the present invention, an object detection device of optical scanning type can be provided which can inhibit a reduction in use efficiency of a projected/received beam at both circumferential ends of the scanning range and fully ensure object detection performance

BRIEF DESCRIPTION OF DRAWINGS

FIG. 4 is a diagram illustrating a state in which a laser spot beam SB (hatched) is emitted in accordance with the rotation of a mirror unit MU to scan a detection range G of the laser radar LR.

FIG. 5A is a front view of a first mirror surface M1, and FIG. 5B is a diagram illustrating the first mirror surface turned.

FIG. 6 is a perspective view of a main portion of a laser radar LR according to a second embodiment, excluding a casing.

DESCRIPTION OF EMBODIMENTS

Figure 1:
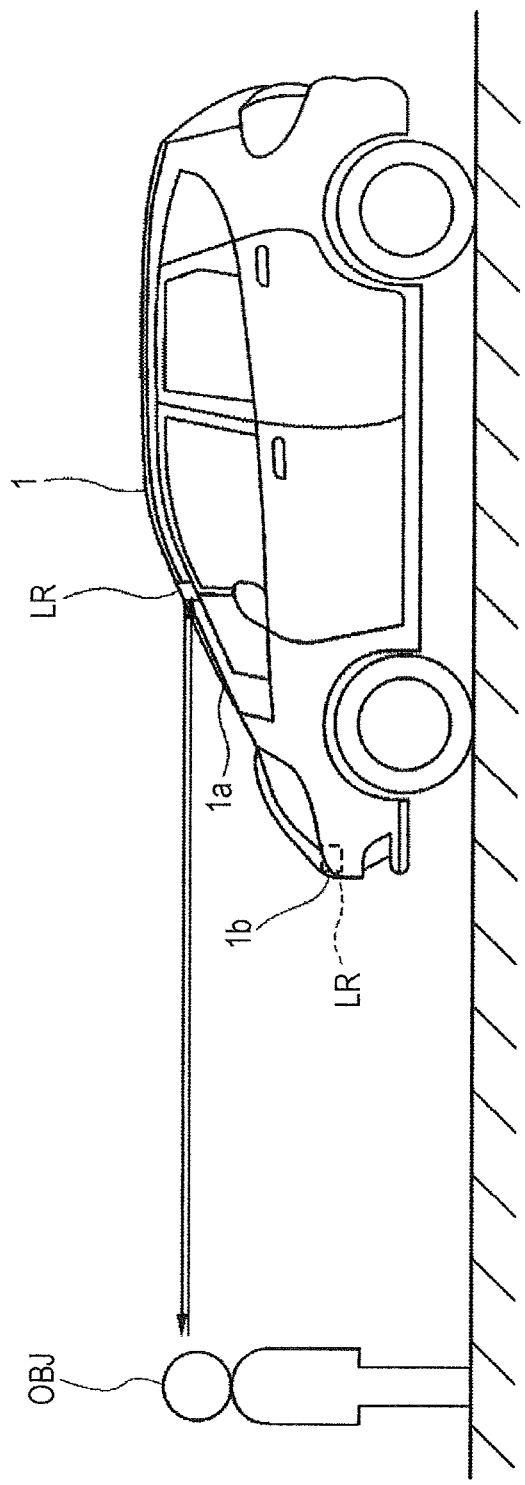
FIG. 1 is a schematic diagram illustrating a state in which a laser radar as an object detection device of optical scanning type according to the present embodiment is mounted to a vehicle.

Hereinafter, embodiments of the present invention will be described with reference to the accompanied drawings. FIG. 1 is a schematic diagram illustrating a state in which a laser radar as an object detection device of optical scanning type according to the present embodiment is mounted to a vehicle. The laser radar LR according to the present embodiment is provided at an upper end of a windshield 1a on the inside of the vehicle 1, but the laser radar LR may be disposed at another place, such as on the outside of the vehicle (e.g., behind a front grille 1b).

First Embodiment

Figure 2:
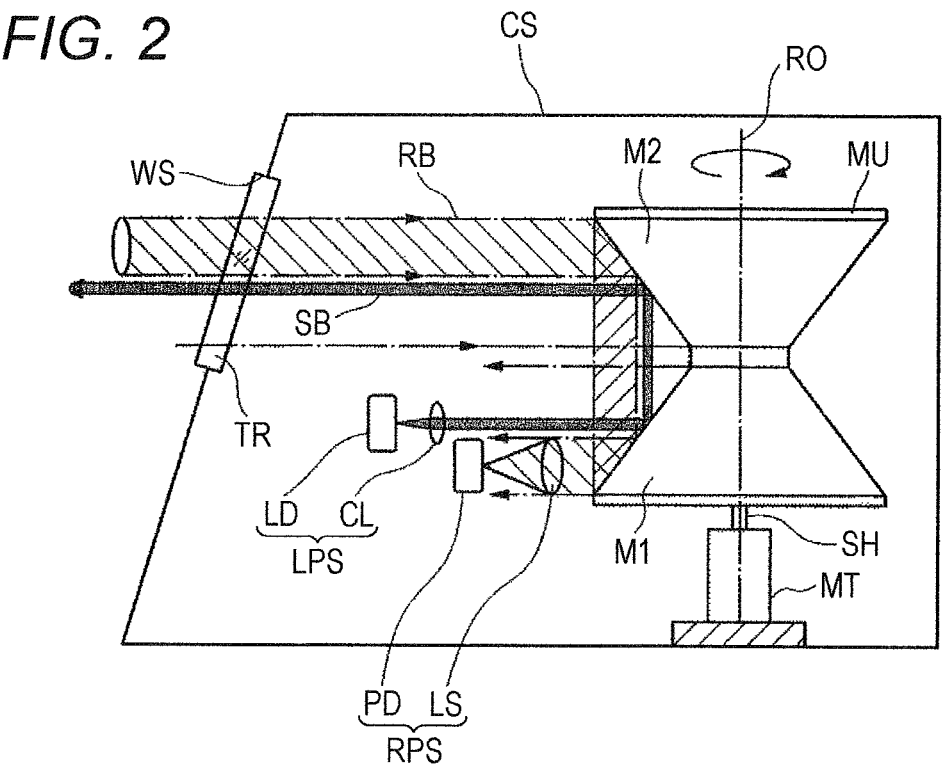
FIG. 2 is a cross-sectional view of a laser radar LR according to a first embodiment.
Figure 3:
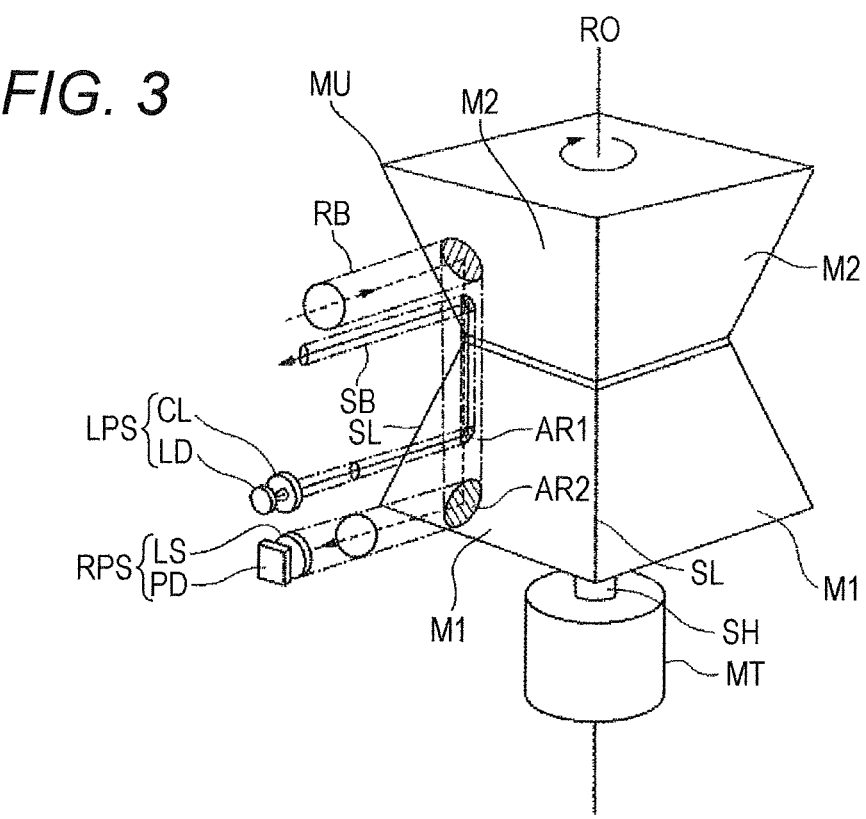
FIG. 3 is a perspective view of a main portion of the laser radar LR according to the first embodiment, excluding a casing.

FIG. 2 is a cross-sectional view of a laser radar LR according to a first embodiment, and FIG. 3 is a perspective view of a main portion of the laser radar LR according to the first embodiment, excluding a casing, but the shape, length, or the like of each component element may be different from those of actual component elements. As illustrated in FIG. 2, the laser radar LR is housed in the casing CS. The casing CS has a side portion in which a window portion WS is formed to enable input and output of a beam, and the window portion WS includes a transparent plate TR made of glass or resin.

As illustrated in FIGS. 2 and 3, the laser radar LR includes a pulsed semiconductor laser (light source) LD for emitting, for example, a laser beam, a collimator lens CL for reducing a divergence angle of divergent light from the semiconductor laser LD and converting the divergent light into substantially parallel light, a mirror unit MU for scanning and projecting a laser beam made substantially parallel by the collimator lens CL to an object OBJ (FIG. 1) by a mirror surface rotated and reflecting light scanned and projected to the object OBJ and scattered from the object OBJ, a lens LS for collecting the light scattered from the object OBJ and reflected by the mirror unit MU, and a photodiode (light reception element) PD for receiving the light collected by the lens LS.

The semiconductor laser LD and the collimator lens CL constitute a light projecting system LPS, and the lens LS and the photodiode PD constitute a light receiving system RPS. The light projecting system LPS and the light receiving system RPS each have optical axes each substantially perpendicular to a rotation axis RO of the mirror unit MU and both parallel to each other.

The mirror unit MU has a shape like two square pyramids oppositely joined and integrated, that is, has four pairs of mirror surfaces M1 and M2 in which each pair of mirror surfaces M1 and M2 is inclined to each other in facing directions. The mirror unit MU is a so-called two-reflection type. The crossing angles between the mirror surfaces M1 and M2 of the respective pairs are different from each other. The mirror surfaces M1 and M2 inclined in directions crossing the rotation axis RO are preferably formed by vapor deposition of reflection coating on a surface of a resin material (e.g., PC) having the shape of the mirror unit. The mirror unit MU is configured to be connected to a shaft SH of a motor MT and rotatably driven.

Next, operation of detecting the object by the laser radar LR will be described. In FIGS. 2 and 3, pulsed divergent light intermittently emitted from the semiconductor laser LD is converted into a substantially parallel beam SB by the collimator lens CL, is incident on a first mirror surface M1 of the mirror unit MU during rotation and reflected from the first mirror surface M1, is further reflected on a second mirror surface M2 and passes through the transparent plate TR, and is scanned and projected as a laser spot beam having a vertically long elliptical cross-section (may having a circular cross-section or a rectangular cross-section) to the outside toward the object OBJ.

FIG. 4 is a diagram illustrating a state in which the laser spot beam SB (hatched) is emitted in accordance with the rotation of the mirror unit MU to scan a detection range G of the laser radar LR. In the respective combinations of the first mirror surfaces M1 and the second mirror surfaces M2 of the mirror unit MU, the crossing angles between the first mirror surfaces M1 and the second mirror surfaces M2 are different from each other. The laser spot beam is sequentially reflected on a first mirror surface M1 and a second mirror surface M2 during rotation. Firstly, the laser spot beam reflected on a first pair of first mirror surface M1 and second mirror surface M2 is scanned from a left side to a right side in a horizontal direction in a top region Ln1 of the detection range G, in accordance with the rotation of the mirror unit MU. Next, the laser spot beam reflected on a second pair of first mirror surface M1 and second mirror surface M2 is scanned from a left side to a right side in a horizontal direction in the second region Ln2 from the top of the detection range G, in accordance with the rotation of the mirror unit MU. Next, the laser spot beam reflected on a third pair of first mirror surface M1 and second mirror surface M2 is scanned from a left side to a right side in a horizontal direction in the third region Ln3 from the top of the detection range G, in accordance with the rotation of the mirror unit MU. Next, the laser spot beam reflected on a first pair of first mirror surface M1 and second mirror surface M2 is scanned from a left side to a right side in a horizontal direction in a bottom region Ln4 of the detection range G, in accordance with the rotation of the mirror unit MU. Thus, one cycle of scanning of the whole detection range G is completed. Then, after mirror unit MU turns once and the first pair of first mirror surface M1 and second mirror surface M2 is returned, scanning is repeated again for the top region Ln1 to the bottom region Ln4 of the detection range G.

In FIGS. 2 and 3, part of scattered light scattered from the object OBJ, of a scanned and projected beam, passes through the transparent plate TR again, is incident on a second mirror surface M2 of the mirror unit MU in the casing CS and reflected from the second mirror surface M2, is further reflected on a first mirror surface M1 and collected by the lens LS, and is detected by a light receiving surface of the photodiode PD. In a circuit, not illustrated, a difference in time between emission of the beam by the semiconductor laser LD and detection of the beam by the photodiode PD is determined, and a distance to the object OBJ can be obtained.

However, even if the whole surfaces of the second mirror surface M2 and the first mirror surface M1 reflect the scattered light from the object OBJ, the scattered light is restricted by the lens LS (formed in a circular shape here, but not limited to the circular shape) functioning as an aperture diaphragm, and only part of the scattered light is finally incident on the photodiode PD. That is, only a beam hatched of light scattered from an object and input from the window portion WS is collected by the lens LS and received by the photodiode PD. Here, when a beam collected by the lens LS is represented as a received beam RB, the received beam RB having a cross-section of a predetermined shape is incident on the lens LS via the second mirror surface M2 and the first mirror surface M1, as indicated by a dashed-dotted line in FIG. 3. The received beam RB is not limited to a circular cross-section, but herein a description is made on the assumption that the received beam RB has a circular cross-section.

FIG. 5A is a front view of a first mirror surface M1 of the mirror unit MU, and FIG. 5B is a diagram illustrating a state in which the mirror unit MU is turned from the state of FIG. 5A.

As apparent from FIGS. 5A and 5B, it is found that when the mirror unit MU is turned from a front position of the first mirror surface M1, the area of the first mirror surface M1 projected perpendicularly to FIG. 5B (the area of a region viewed from the collimator lens CL or the condenser lens LS) is smaller than the area of the first mirror surface M1 projected perpendicularly to FIG. 5A.

Accordingly, in an emitted beam SB from the collimator lens CL and the received beam RB collected by the condenser lens LS, when the first mirror surface M1 is turned as illustrated in FIG. 5B relative to the position which the first mirror surface M1 faces as illustrated in FIG. 5A, the area of the first mirror surface M1 projected perpendicularly to FIG. 5B is reduced, room (interval) between a side SL of the first mirror surface M1 and each of the peripheral edges of the emitted beam SB and the received beam RB is gradually reduced, and when a rotation angle is increased, vignetting is caused.

Therefore, in the present embodiment, the light projecting system including the semiconductor laser LD and the light receiving system including the photodiode PD are disposed so that a larger one (here, AR2) of the area (AR1 in FIG. 5) of a region on the first mirror surface M1 occupied by the emitted beam SB emitted from the semiconductor laser LD (incident region) and the area (AR2 in FIG. 5) of a region on the first mirror surface M1 occupied by the received beam RB incident on the photodiode PD has a larger movement length on the mirror surface during rotation than a smaller one (here, AR1). Thus, the vignetting of the emitted beam SB and the received beam RB can be inhibited. The positions of the emitted beam SB and the received beam RB on a mirror surface are moved with the rotation of the mirror unit, but, herein, "movement length" represents each of the lengths of movements of the emitted beam SB and the received beam RB on the mirror surface of the mirror unit at the same rotation angle. In other words, a larger movement length is a larger length of a cross-section of a mirror surface taken along a plane perpendicular to the rotation axis.

In the above embodiments, since the area AR1 of a mirror surface occupied by the emitted beam SB is smaller than the area AR2 of the mirror surface occupied by the received beam RB, the received beam RB is disposed on a side on which the received beam RB has a larger movement length, but in contrast, when the area AR1 of the mirror surface occupied by the emitted beam SB is larger than the area AR2 of the mirror surface occupied by the received beam RB, the emitted beam SB is disposed on a side on which the emitted beam SB has a larger movement length, achieving the above effects.

Second Embodiment

FIG. 6 is a perspective view of a main portion of the laser radar LR according to a second embodiment, excluding a casing. In the present embodiment, the mirror unit MU of FIGS. 2 and 3 is cut into half at the center in a direction of the rotation axis RO, and four mirror surfaces MR are disposed around the rotation axis RO. The mirror unit MU is a so-called one reflection type. The crossing angles between the respective mirror surfaces MR and the rotation axis RO are different from each other. Furthermore, the optical axis of the light projecting system LPS including the semiconductor laser (light source) LD and the collimator lens CL and the optical axis of the light receiving system RPS including the lens LS and the photodiode (light reception element) PD are parallel to the rotation axis RO.

According to the present embodiment, pulsed divergent light intermittently emitted from the semiconductor laser LD is converted into a substantially parallel beam SB by the collimator lens CL, is incident on a mirror surface MR of the mirror unit MU during rotation and reflected from the mirror surface MR, and is scanned and projected as a laser spot beam to the outside toward the object OBJ. Furthermore, part of scattered light scattered from the object OBJ is incident as a received beam RB to a mirror surface MR of the mirror unit MU R again and reflected from the mirror surface MR, is collected by the lens LS, and detected by a light receiving surface of the photodiode PD.

In the present embodiment as well, the light projecting system including the semiconductor laser LD and the light receiving system including the photodiode PD are disposed so that a larger one (here, AR2) of the area (AR1 in FIG. 6) of the mirror surface MR occupied by the emitted beam SB emitted from the semiconductor laser LD and the area (AR2 in FIG. 6) of the mirror surface MR occupied by the received beam RB incident on the photodiode PD has a larger movement length on the mirror surface MR during rotation. The other configurations are similar to those in the above-mentioned embodiments.

In the above embodiments, the emitted beam SB and the received beam RB are separated from each other on the mirror surface M1(MR), but the emitted beam SB and the received beam RB may be in contact with each other or may overlap each other.

Hereinafter examples performed by the inventors of the present invention will be described. Herein, a beam incident on a mirror surface in a direction perpendicular to the rotation axis has an oblong cross-section and an emitted beam has a circular cross-section, but in the case of non-circular cross-section (here, the oblong cross-section of the incident beam), after the cross-section is converted to a circular cross-section of equal area (indicated by a dashed line in FIG. 5), the radius of a small-diameter beam is designated r1 and the radius of a large-diameter beam is designated r2. Furthermore, with reference to FIG. 5, a distance in the direction of the rotation axis between an intersection P1 of extension lines of sides SL in a mirror surface M1 of the mirror unit and a distant point P2 on the mirror surface M1 which is farthest from the intersection P1 in the direction of the rotation axis of the mirror unit is designated H. The distance from the distant point P2 to the center of a beam is denoted by h. The following figures are numbered on one side, where the rotation angle of the mirror unit is 0° at a position facing a first mirror surface. Furthermore, a mirror use efficiency of 1 represents generation of no vignetting, and a mirror use efficiency of 0 represents generation of complete vignetting. For ease of calculation, H=10 (mm).

Example 1

Figure 7:
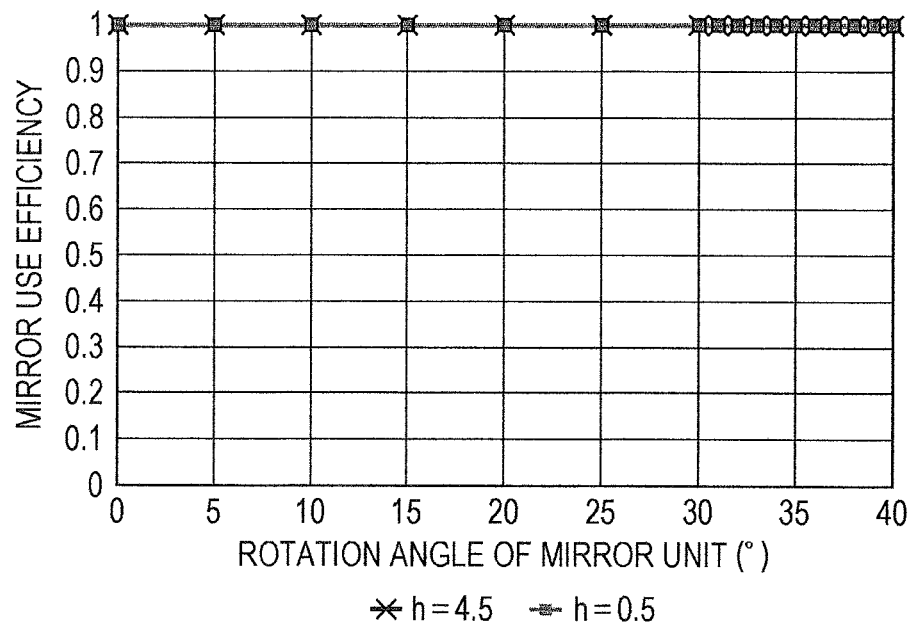
FIG. 7 is a graph illustrating mirror use efficiency of a small-diameter beam of radius r1=0.5 mm with respect to the rotation angle of a mirror unit of one-reflection type.
Figure 8:
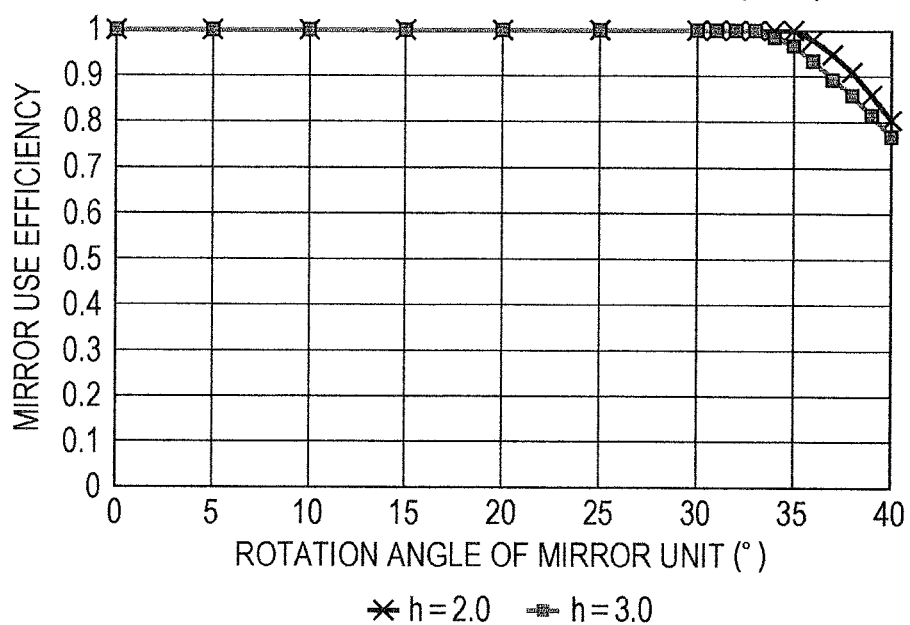
FIG. 8 is a graph illustrating mirror use efficiency of a large-diameter beam of radius r2=2.0 mm with respect to the rotation angle of the mirror unit of one-reflection type.
Figure 9:
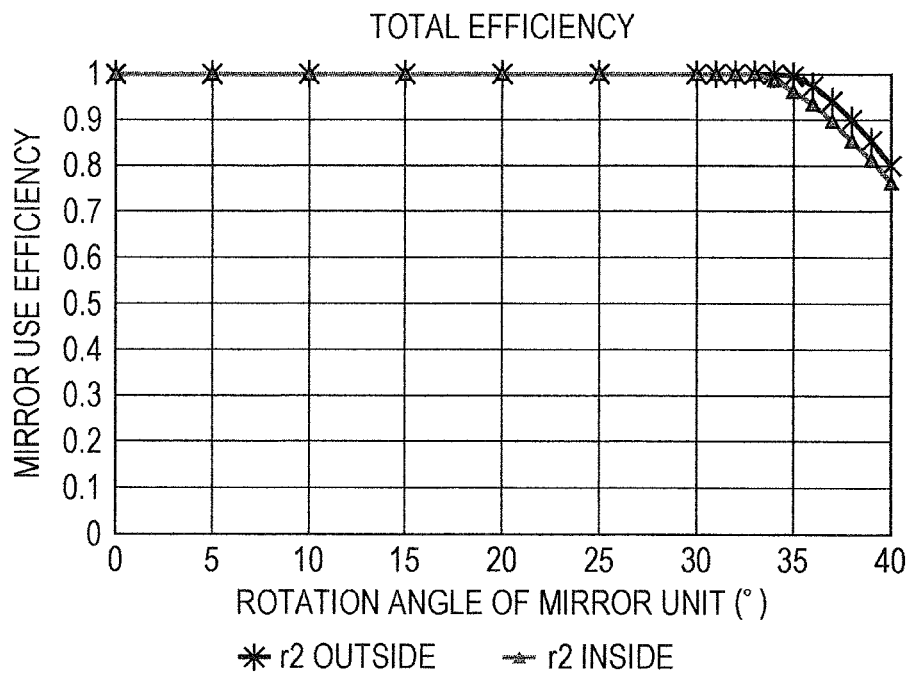
FIG. 9 is a graph illustrating total efficiency obtained by multiplying the mirror use efficiency of a beam having the specification of FIG. 7 and the mirror use efficiency of a beam having the specification of FIG. 8.

FIG. 7 is a graph illustrating mirror use efficiency of a small-diameter beam of radius r1=0.5 mm with respect to the rotation angle of the mirror unit of one-reflection type, where h=4.5 and h=0.5 mm FIG. 8 is a graph illustrating mirror use efficiency of a large-diameter beam of radius r2=2.0 mm with respect to the rotation angle of the mirror unit of one-reflection type, where h=2.0 mm and h=3.0 mm FIG. 9 is a graph obtained by multiplying the mirror use efficiency of FIG. 7 where r1=0.5 mm and h=4.5 mm, and the mirror use efficiency of FIG. 8 where r2=2.0 mm and h=2.0 mm, and this is described as r2 outside. In addition, FIG. 9 is a graph obtained by multiplying the mirror use efficiency of FIG. 7 where r1=0.5 mm and h=0.5 mm, and the mirror use efficiency of FIG. 8 where r2=2.0 mm and h=3.0 mm, and this is described as r2 inside. That is, FIG. 9 illustrates the total efficiency of projected/received light. In the present example, a peripheral edge of the small-diameter beam is in contact with a peripheral edge of the large-diameter beam.

According to FIG. 9, it is found that when the rotation angle of the mirror unit is not less than 34°, the mirror use efficiency of a combination of the small-diameter beam (h=0.5 mm) and the large-diameter beam (h=3.0 mm) (r2 inside) is lower than that of a combination of the small-diameter beam (h=4.5 mm) and the large-diameter beam (h=2.0 mm) (r2 outside). That is, it is found that when the large-diameter beam is disposed on a side on which the large-diameter beam has a relatively larger movement length on a mirror surface during rotation, a reduction in mirror use efficiency can be inhibited.

Example 2

Figure 10:
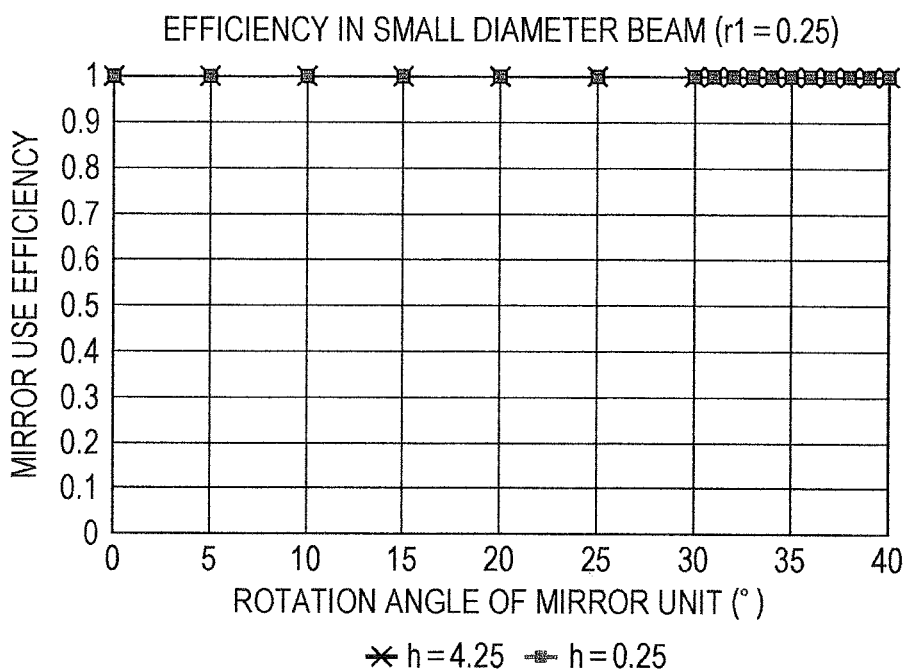
FIG. 10 is a graph illustrating mirror use efficiency of a small-diameter beam of radius r1=0.25 mm with respect to the rotation angle of the mirror unit of one-reflection type.
Figure 11:
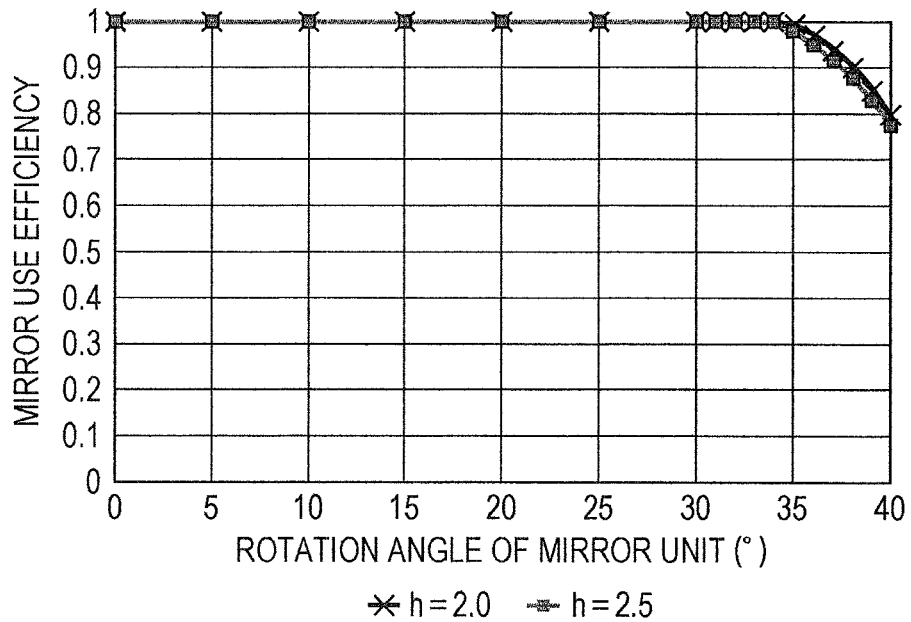
FIG. 11 is a graph illustrating mirror use efficiency of a large-diameter beam of radius r2=2.0 mm with respect to the rotation angle of the mirror unit of one-reflection type.
Figure 12:
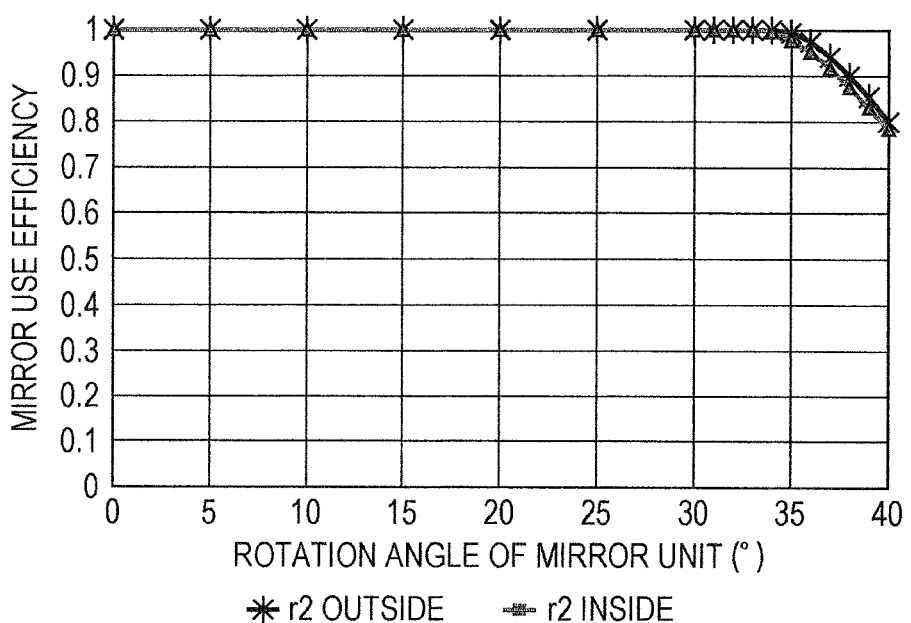
FIG. 12 is a graph illustrating total efficiency obtained by multiplying the mirror use efficiency of a beam having the specification of FIG. 10 and the mirror use efficiency of a beam having the specification of FIG. 11.

FIG. 10 is a graph illustrating mirror use efficiency of a small-diameter beam of radius r1=0.25 mm with respect to the rotation angle of the mirror unit of one-reflection type, where h=4.25 and h=0.25 mm. FIG. 11 is a graph illustrating mirror use efficiency of the large-diameter beam of radius r2=2.0 mm with respect to the rotation angle of the mirror unit of one-reflection type, where h=2.0 mm and h=2.5 mm. FIG. 12 is a graph obtained by multiplying the mirror use efficiency of FIG. 10 where r1=0.25 mm and h=4.25 mm, and the mirror use efficiency of FIG. 11 where r2=2.0 mm and h=2.0 mm, and this is described as r2 outside. Furthermore, FIG. 12 is a graph obtained by multiplying the mirror use efficiency of FIG. 10 where r1=0.25 mm and h=0.25 mm, and the mirror use efficiency of FIG. 11 where r2=2.0 mm and h=2.5 mm, and this is described as r2 inside. That is, FIG. 12 illustrates the total efficiency of projected/received light. In the present example, a peripheral edge of the small-diameter beam is in contact with a peripheral edge of the large-diameter beam.

According to FIG. 12, it is found that when the rotation angle of the mirror unit is not less than 35°, the mirror use efficiency of a combination of the small-diameter beam (h=0.25 mm) and the large-diameter beam (h=2.5 mm) (r2 inside) is lower than that of a combination of the small-diameter beam (h=4.25 mm) and the large-diameter beam (h=2.0 mm) (r2 outside). That is, it is found that when the large-diameter beam is disposed on a side on which the large-diameter beam has a relatively larger movement length on a mirror surface during rotation, a reduction in mirror use efficiency can be inhibited.

Example 3

Figure 13:
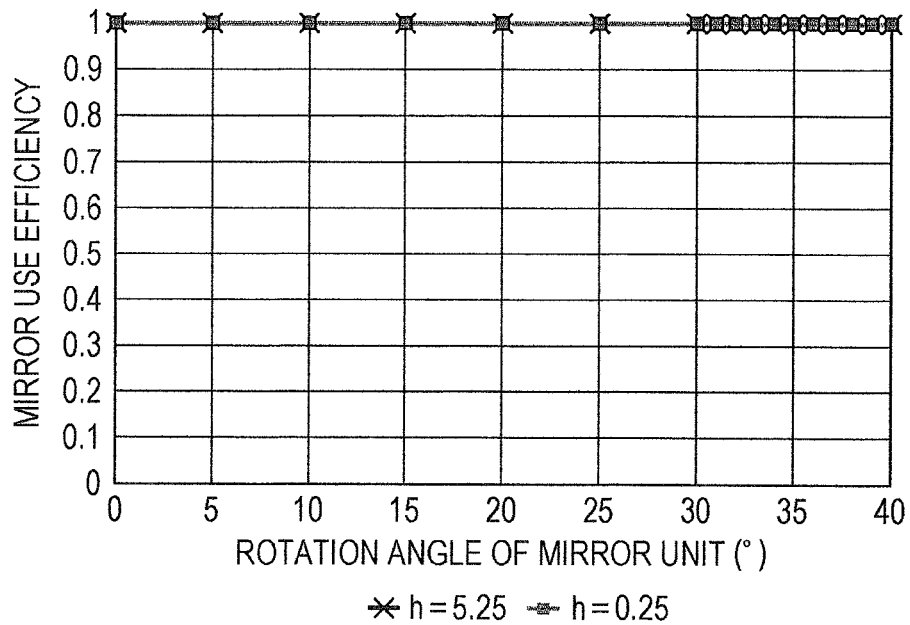
FIG. 13 is a graph illustrating mirror use efficiency of a small-diameter beam of radius r1=0.25 mm with respect to the rotation angle of the mirror unit of one-reflection type.
Figure 14:
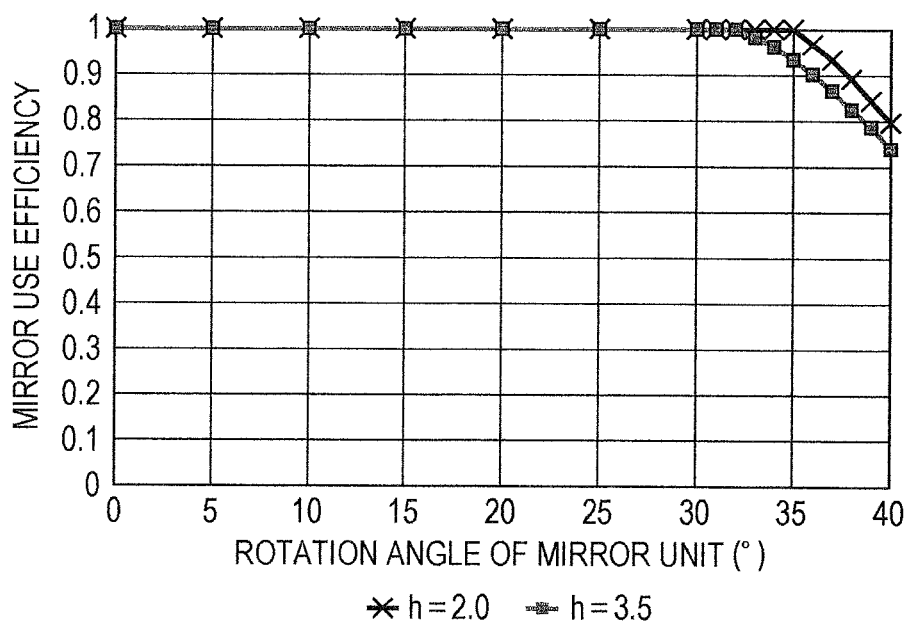
FIG. 14 is a graph illustrating mirror use efficiency of a large-diameter beam of radius r2=2.0 mm with respect to the rotation angle of the mirror unit of one-reflection type.
Figure 15:
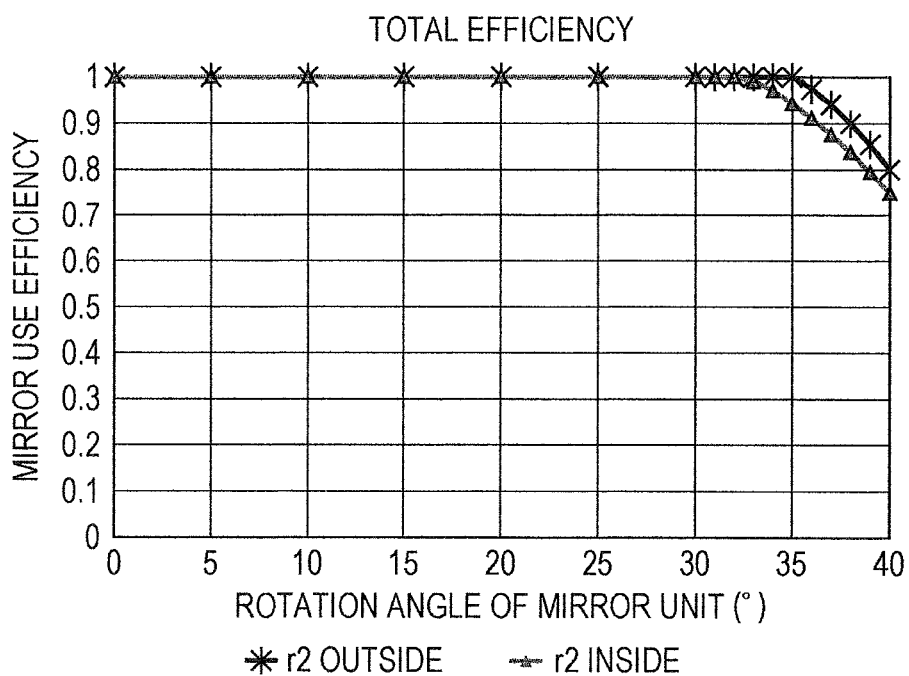
FIG. 15 is a graph illustrating total efficiency obtained by multiplying the mirror use efficiency of a beam having the specification of FIG. 13 and the mirror use efficiency of a beam having the specification of FIG. 14.

FIG. 13 is a graph illustrating mirror use efficiency of a small-diameter beam of radius r1=0.25 mm with respect to the rotation angle of the mirror unit of one-reflection type, where h=5.25 mm and h=0.25 mm. FIG. 14 is a graph illustrating mirror use efficiency of a large-diameter beam of radius r2=2.0 mm with respect to the rotation angle of the mirror unit of one-reflection type, where h=2.0 mm and h=3.5 mm. FIG. 15 is a graph obtained by multiplying the mirror use efficiency of FIG. 13 where r1=0.25 mm and h=5.25 mm, and the mirror use efficiency of FIG. 14 where r2=2.0 mm and h=2.0 mm, and this is described as r2 outside. Furthermore, FIG. 15 is a graph obtained by multiplying the mirror use efficiency of FIG. 13 where r1=0.25 mm and h=0.25 mm, and the mirror use efficiency of FIG. 14 where r2=2.0 mm and h=3.5 mm, and this is described as r2 inside. That is, FIG. 15 illustrates the total efficiency of projected/received light. In the present example, a peripheral edge of the small-diameter beam is separated from a peripheral edge of the large-diameter beam by 1 mm.

According to FIG. 15, it is found that when the rotation angle of the mirror unit is not less than 33°, the mirror use efficiency of a combination of the small-diameter beam (h=0.25 mm) and the large-diameter beam (h=3.5 mm) (r2 inside) is lower than that of a combination of the small-diameter beam (h=5.25 mm) and the large-diameter beam (h=2.0 mm) (r2 outside). That is, it is found that when the large-diameter beam is disposed on a side on which the large-diameter beam has a relatively larger movement length on a mirror surface during rotation, a reduction in mirror use efficiency can be inhibited.

Example 4

Figure 16:
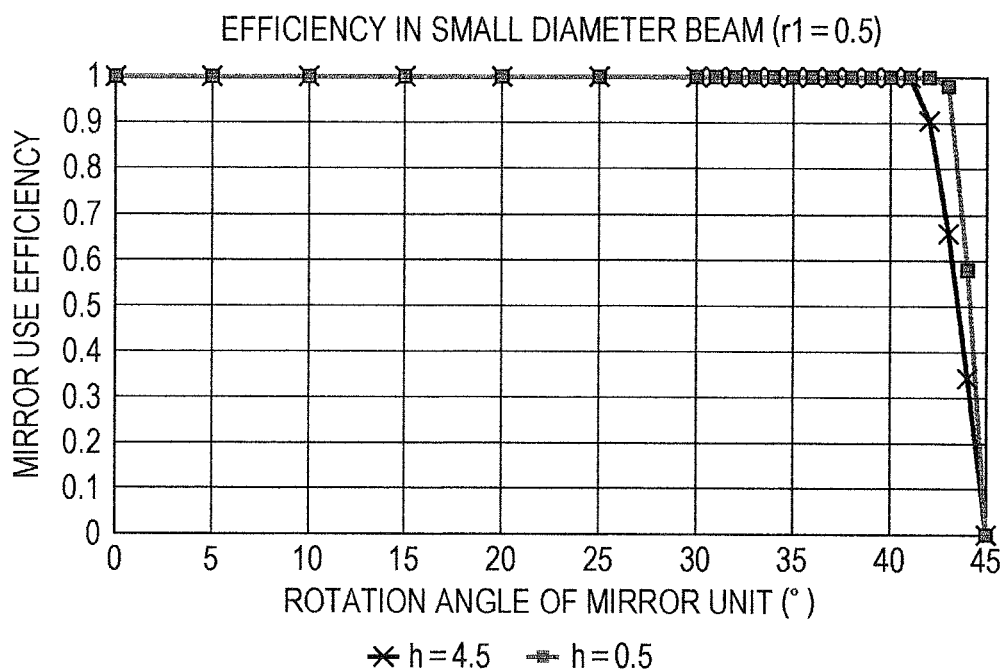
FIG. 16 is a graph illustrating mirror use efficiency of a small-diameter beam of radius r1=0.5 mm with respect to the rotation angle of a mirror unit of two-reflection type.
Figure 17:
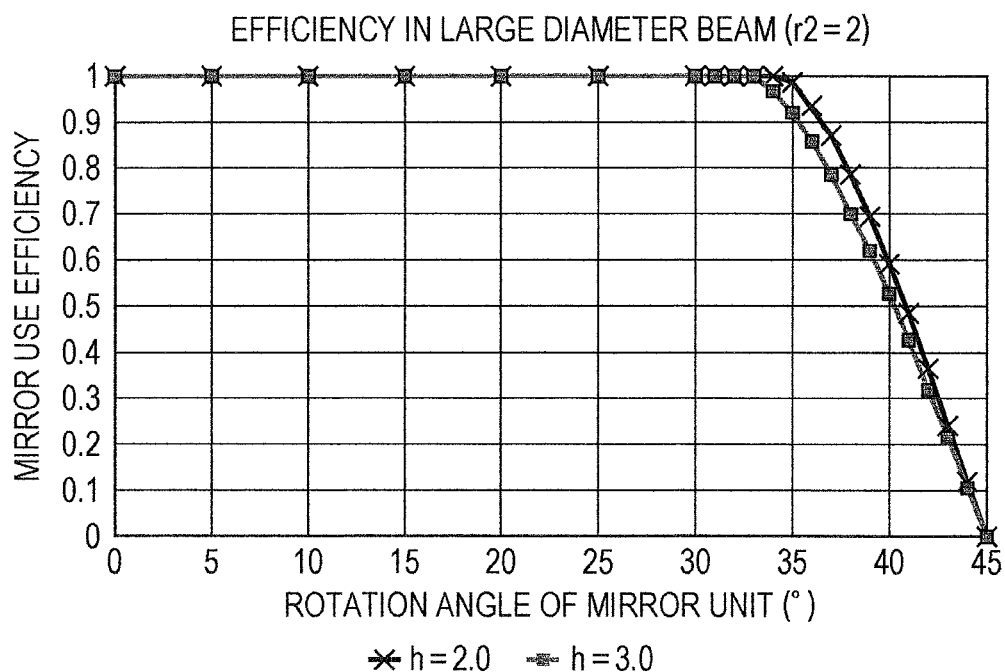
FIG. 17 is a graph illustrating mirror use efficiency of a large-diameter beam of radius r2=2.0 mm with respect to the rotation angle of the mirror unit of two-reflection type.
Figure 18:
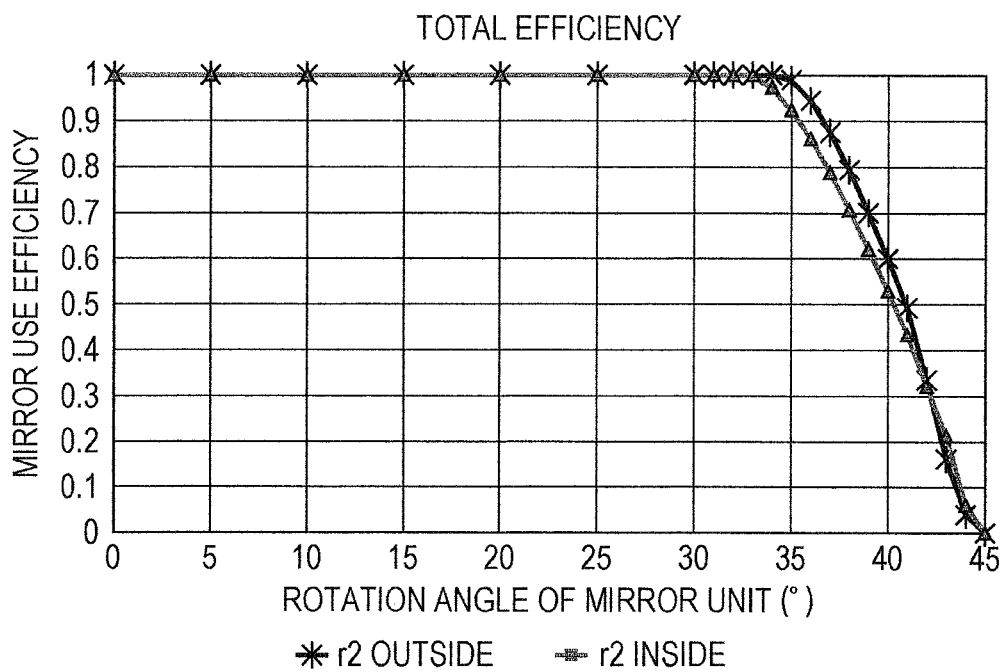
FIG. 18 is a graph illustrating total efficiency obtained by multiplying the mirror use efficiency of a beam having the specification of FIG. 16 and the mirror use efficiency of a beam having the specification of FIG. 17.

FIG. 16 is a graph illustrating mirror use efficiency of a small-diameter beam of radius r1=0.5 mm with respect to the rotation angle of a mirror unit of two-reflection type, where h=4.5 mm and h=0.5 mm. FIG. 17 is a graph illustrating mirror use efficiency of a large-diameter beam of radius r2=2.0 mm with respect to the rotation angle of the mirror unit of two-reflection type, where h=2.0 mm and h=3.0 mm. FIG. 18 is a graph obtained by multiplying the mirror use efficiency of FIG. 16 where r1=0.5 mm and h=4.5 mm, and the mirror use efficiency of FIG. 17 where r2=2.0 mm and h=2.0 mm, and this is described as r2 outside. Furthermore, FIG. 18 is a graph obtained by multiplying the mirror use efficiency of FIG. 16 where r1=0.5 mm and h=0.5 mm, and the mirror use efficiency of FIG. 17 where r2=2.0 mm and h=3.0 mm, and this is described as r2 inside. That is, FIG. 18 illustrates the total efficiency of projected/received light. In the present example, a peripheral edge of the small-diameter beam is in contact with a peripheral edge of the large-diameter beam.

According to FIG. 18, it is found that when the rotation angle of the mirror unit is within a range of 34° to 42°, the mirror use efficiency of a combination of the small-diameter beam (h=0.5 mm) and the large-diameter beam (h=3.0 mm) (r2 inside) is lower than that of a combination of the small-diameter beam (h=4.5 mm) and the large-diameter beam (h=2.0 mm) (r2 outside). That is, it is found that when the large-diameter beam is disposed on a side on which the large-diameter beam has a relatively larger movement length on a mirror surface during rotation, a reduction in mirror use efficiency can be inhibited. It should be noted that r2 inside and r2 outside are reversed in a region where the rotation angle exceeds 42°, but the mirror use efficiency is considerably small in this area, and this area is desirably defined as a non-use area.

Example 5

Figure 19:
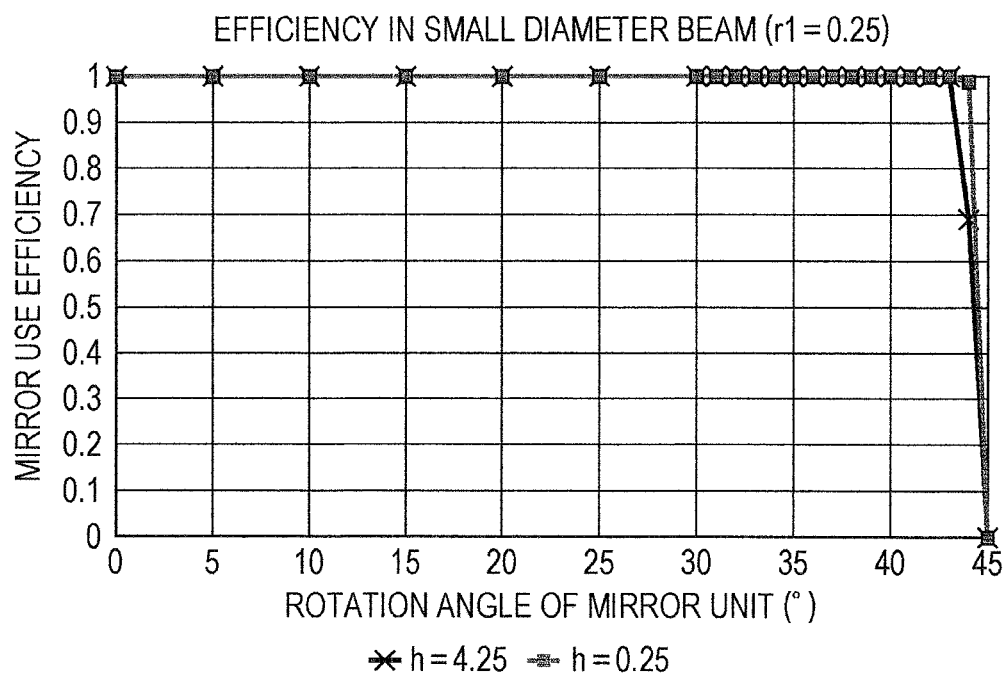
FIG. 19 is a graph illustrating mirror use efficiency of a small-diameter beam of radius r1=0.25 mm with respect to the rotation angle of the mirror unit of two-reflection type.
Figure 20:
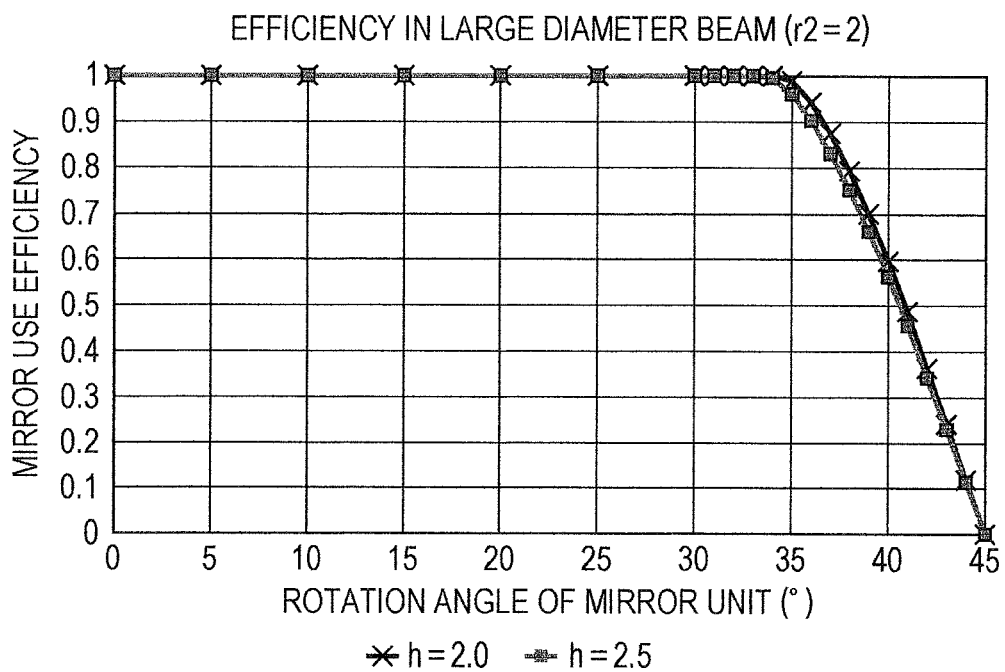
FIG. 20 is a graph illustrating mirror use efficiency of a large-diameter beam of radius r2=2.0 mm with respect to the rotation angle of the mirror unit of two-reflection type.
Figure 21:
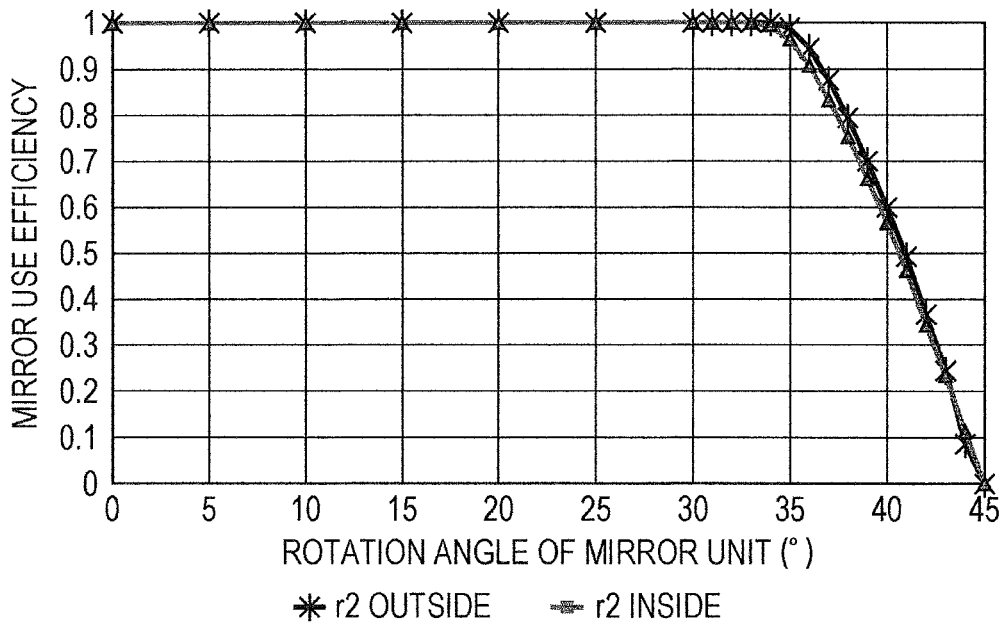
FIG. 21 is a graph illustrating total efficiency obtained by multiplying the mirror use efficiency of a beam having the specification of FIG. 19 and the mirror use efficiency of a beam having the specification of FIG. 20.

FIG. 19 is a graph illustrating mirror use efficiency of a small-diameter beam of radius r1=0.25 mm with respect to the rotation angle of the mirror unit of two-reflection type, where h=4.25 mm and h=0.25 mm. FIG. 20 is a graph illustrating mirror use efficiency of a large-diameter beam of radius r2=2.0 mm with respect to the rotation angle of the mirror unit of two-reflection type, where h=2.0 mm and h=2.5 mm. FIG. 21 is a graph obtained by multiplying the mirror use efficiency of FIG. 19 where r1=0.25 mm and h=4.25 mm, and the mirror use efficiency of FIG. 20 where r2=2.0 mm and h=2.0 mm, and this is described as r2 outside. Furthermore, FIG. 21 is a graph obtained by multiplying the mirror use efficiency of FIG. 19 where r1=0.25 mm and h=0.25 mm, and the mirror use efficiency of FIG. 20 where r2=2.0 mm and h=2.5 mm, and this is described as r2 inside. That is, FIG. 21 illustrates the total efficiency of projected/received light. In the present example, a peripheral edge of the small-diameter beam is in contact with a peripheral edge of the large-diameter beam.

According to FIG. 21, it is found that when the rotation angle of the mirror unit is within a range of 34° to 43°, the mirror use efficiency of a combination of the small-diameter beam (h=0.25 mm) and the large-diameter beam (h=2.5 mm) (r2 inside) is lower than that of a combination of the small-diameter beam (h=4.25 mm) and the large-diameter beam (h=2.0 mm) (r2 outside). That is, it is found that when the large-diameter beam is disposed on a side on which the large-diameter beam has a relatively larger movement length on a mirror surface during rotation, a reduction in mirror use efficiency can be inhibited. It should be noted that r2 inside and r2 outside are reversed in a region where the rotation angle exceeds 43°, but the mirror use efficiency is considerably small in this area, and this area is desirably defined as a non-use area.

Example 6

Figure 22:
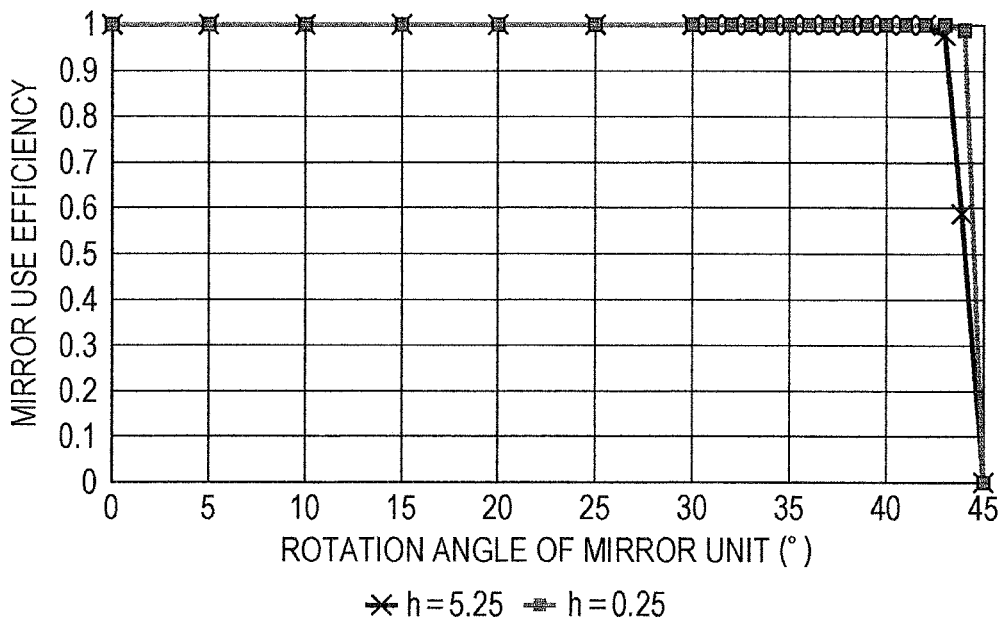
FIG. 22 is a graph illustrating mirror use efficiency of a small-diameter beam of radius r1=0.25 mm with respect to the rotation angle of the mirror unit of two-reflection type.
Figure 23:
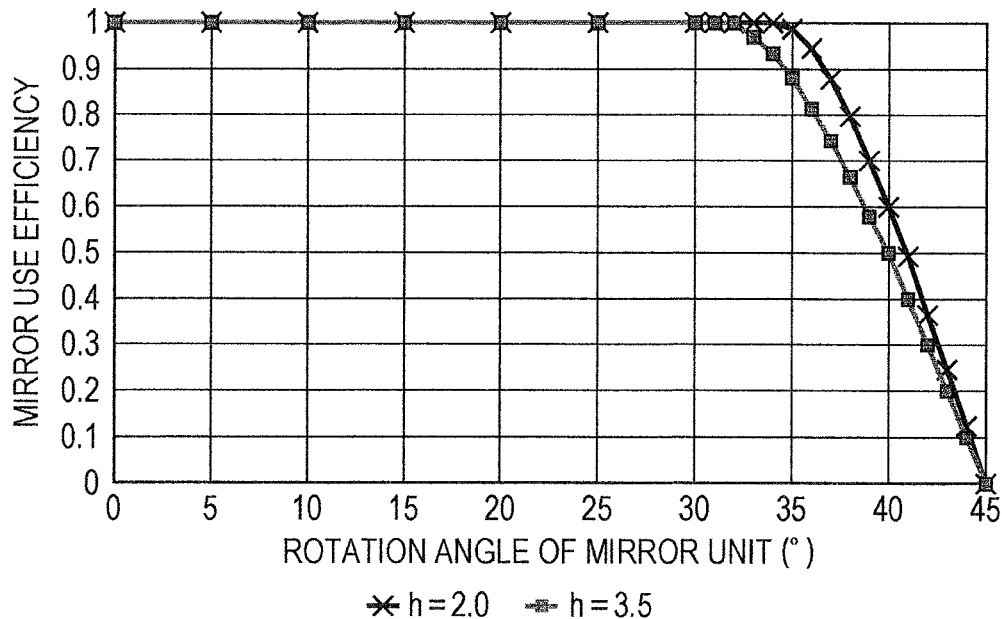
FIG. 23 is a graph illustrating mirror use efficiency of a large-diameter beam of radius r2=2.0 mm with respect to the rotation angle of the mirror unit of two-reflection type.
Figure 24:
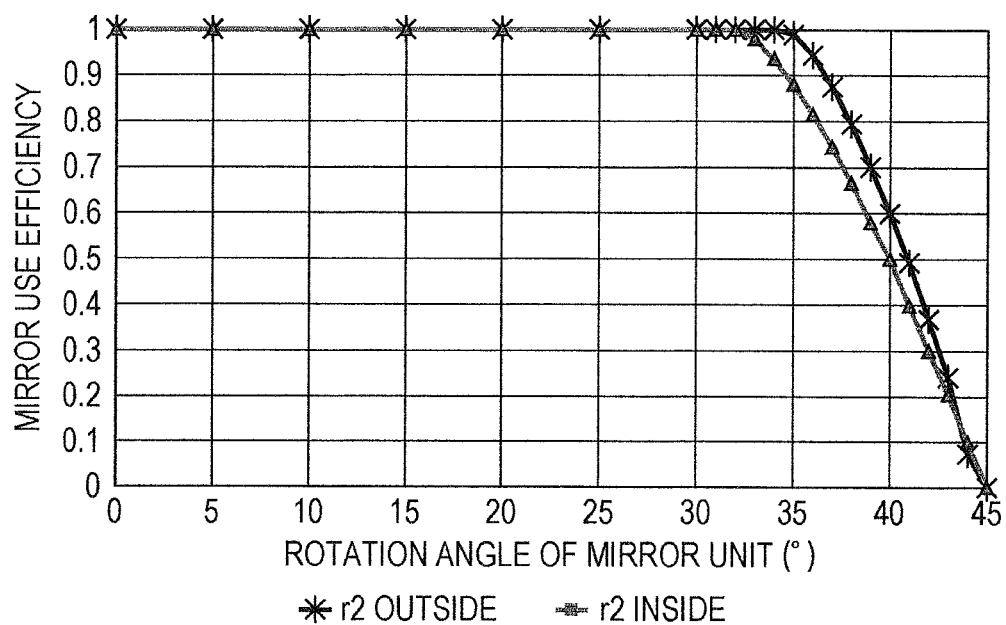
FIG. 24 is a graph illustrating total efficiency obtained by multiplying the mirror use efficiency of a beam having the specification of FIG. 22 and the mirror use efficiency of a beam having the specification of FIG. 23.

FIG. 22 is a graph illustrating mirror use efficiency of a small-diameter beam of radius r1=0.25 mm with respect to the rotation angle of the mirror unit of two-reflection type, where h=5.25 mm and h=0.25 mm. FIG. 23 is a graph illustrating mirror use efficiency of a large-diameter beam of radius r2=2.0 mm with respect to the rotation angle of the mirror unit of two-reflection type, where h=2.0 mm and h=3.5 mm. FIG. 24 is a graph obtained by multiplying the mirror use efficiency of FIG. 22 where r1=0.25 mm and h=5.25 mm, and the mirror use efficiency of FIG. 23 where r2=2.0 mm and h=2.0 mm, and this is described as r2 outside. Furthermore, FIG. 24 is a graph obtained by multiplying the mirror use efficiency of FIG. 22 where r1=0.25 mm and h=0.25 mm, and the mirror use efficiency of FIG. 23 where r2=2.0 mm and h=3.5 mm, and this is described as r2 inside. That is, FIG. 24 illustrates the total efficiency of projected/received light. In the present example, a peripheral edge of the small-diameter beam is separated from a peripheral edge of the large-diameter beam by 1 mm.

According to FIG. 24, it is found that when the rotation angle of the mirror unit is within a range of 33° to 43°, the mirror use efficiency of a combination of the small-diameter beam (h=0.25 mm) and the large-diameter beam (h=3.5 mm) (r2 inside) is lower than that of a combination of the small-diameter beam (h=5.25 mm) and the large-diameter beam (h=2.0 mm) (r2 outside). That is, it is found that when the large-diameter beam is disposed on a side on which the large-diameter beam has a relatively larger movement length on a mirror surface during rotation, a reduction in mirror use efficiency can be inhibited. It should be noted that r2 inside and r2 outside are reversed in a region where the rotation angle exceeds 43°, but the mirror use efficiency is considerably small in this area, and this area is desirably defined as a non-use area.

In reviewing the above examination results, it is found that, in either the mirror unit of one-reflection type or the mirror unit of two-reflection type, when the light projecting system and the light receiving system are disposed so that a larger one of the area of a region on a mirror surface occupied by a beam emitted from the semiconductor laser and the area of a region on the mirror surface occupied by a beam incident on the photodiode has a larger movement length on the mirror surface during rotation, beam vignetting can be improved to inhibit a reduction in light projection/reception efficiency of the laser radar, and an object detection device of optical scanning type fully ensuring object detection performance can be obtained.

It is clear for a person skilled in the art from the embodiments, examples, and technical concepts described herein that the present invention should not be limited to the embodiments and examples described herein, and includes other embodiments, examples, and modifications. Description and examples herein are exemplary only, and the scope of the present invention is defined by the appended claims. For example, all of the contents of the present invention described with reference to the drawings can be applied to the embodiments, and may be mounted to an air vehicle such as helicopter or may be used for a crime prevention sensor to detect suspicious individuals by being installed in a building. Furthermore, in the above embodiments, the semiconductor laser is used as the light source, but the light source is not limited to the semiconductor laser, and as a matter of course, an LED or the like may be used as the light source.

REFERENCE SIGNS LIST 1 vehicle
1a windshield
1b front grille
CL collimator lens
CS casing
G detection range
LD semiconductor laser
Ln1 to Ln4 region
LPS light projecting system
LR laser radar
LS lens
M1 first mirror surface
M2 second mirror surface
MR mirror surface
MT motor
MU mirror unit
OBJ object
PD photodiode
RB received beam
RO rotation axis
RPS light receiving system
SB laser spot beam
SH shaft
TR transparent plate
WS window portion

The invention claimed is:

1. An object detection device of optical scanning type comprising:
    a mirror unit having a mirror surface formed to be inclined in a direction crossing a rotation axis;
    a light projecting system including a light source; and
    a light receiving system including a light reception element,
    wherein a beam emitted from the light source is reflected on the mirror surface and scanned and projected by the rotation of the mirror unit, and
    part of a beam scattered from an object, of the scanned and projected beam, is reflected on the mirror surface and received by the light reception element,
    wherein the light projecting system and the light receiving system are disposed so that an area of the mirror surface occupied by a beam emitted from the light source is different from an area of the mirror surface occupied by a beam incident on the light reception element, and a larger one of the two areas has a larger movement length on the mirror surface during rotation than a smaller one.

2. The object detection device of optical scanning type according to claim 1, wherein
    the mirror unit includes a plurality of the mirror surfaces, and crossing angles between the mirror surfaces and the rotation axis are different from each other.

3. The object detection device of optical scanning type according to claim 1, wherein
    an area of the mirror surface occupied by a beam incident on the light reception element is larger than an area of the mirror surface occupied by a beam emitted from the light source.

4. An object detection device of optical scanning type comprising:
    a mirror unit having a first mirror surface and a second mirror surface formed to be inclined in a direction crossing a rotation axis and opposed to each other at a predetermined angle;
    a light projecting system including a light source; and a light receiving system including a light reception element, wherein a beam emitted from the light source is reflected on the first mirror surface, reflected on the second mirror surface, and scanned and projected by the rotation of the mirror unit, and part of a beam scattered from the object, of the scanned and projected beam, is reflected on the second mirror surface, reflected on the first mirror surface, and received by the light reception element, wherein the light projecting system and the light receiving system are disposed so that an area of the first mirror surface occupied by a beam emitted from the light source is different from an area of the first mirror surface occupied by a beam incident on the light reception element, and a larger one of the two areas has a larger movement length on the first mirror surface during rotation than a smaller one.

5. The object detection device of optical scanning type according to claim 4, wherein the mirror unit includes a plurality of pairs of the first and second mirror surfaces, and crossing angles between the first mirror surfaces and the second mirror surfaces are different from each other.

6. The object detection device of optical scanning type according to claim 4, wherein an area of the first mirror surface occupied by a beam incident on the light reception element is larger than an area of the first mirror surface occupied by a beam emitted from the light source.

7. The object detection device of optical scanning type according to claim 2, wherein an area of the mirror surface occupied by a beam incident on the light reception element is larger than an area of the mirror surface occupied by a beam emitted from the light source.

8. The object detection device of optical scanning type according to claim 5, wherein an area of the first mirror surface occupied by a beam incident on the light reception element is larger than an area of the first mirror surface, occupied by a beam emitted from the light source.

* * * * *